United States Patent
Mackjust

(10) Patent No.: US 7,916,004 B2
(45) Date of Patent: Mar. 29, 2011

(54) SECURITY SYSTEM WITH PASSIVE LOCKING BYPASS

(75) Inventor: Tyson Mackjust, Murrieta, CA (US)

(73) Assignee: DEI Headquarters, Inc., Vista, CA (US)

( * ) Notice: Subject to any disclaimer, the term of this patent is extended or adjusted under 35 U.S.C. 154(b) by 613 days.

(21) Appl. No.: 11/642,227

(22) Filed: Dec. 20, 2006

(65) Prior Publication Data
US 2008/0150686 A1 Jun. 26, 2008

(51) Int. Cl.
*B60R 25/10* (2006.01)

(52) U.S. Cl. .......... 340/426.13; 340/539.1; 340/10.5

(58) Field of Classification Search ........... 340/426.13, 340/539.22, 539.1, 426.17, 539.11, 539.32, 340/425.5, 5.72, 10.5
See application file for complete search history.

(56) References Cited

U.S. PATENT DOCUMENTS

| | | | | |
|---|---|---|---|---|
| 4,223,296 A | * | 9/1980 | Kim et al. | 340/457 |
| 5,157,375 A | * | 10/1992 | Drori | 340/429 |
| 5,479,157 A | * | 12/1995 | Suman et al. | 340/5.28 |
| 6,184,779 B1 | * | 2/2001 | Chen | 340/425.5 |
| 6,452,483 B2 | * | 9/2002 | Chen et al. | 340/425.5 |
| 6,700,479 B2 | * | 3/2004 | Birchfield | 340/426.14 |
| 7,034,658 B2 | * | 4/2006 | Hayashi et al. | 340/5.72 |
| 7,429,922 B2 | * | 9/2008 | Teshima et al. | 340/539.32 |
| 2003/0014164 A1 | * | 1/2003 | Shin | 701/2 |
| 2005/0179588 A1 | * | 8/2005 | Kim | 342/357.07 |
| 2006/0255908 A1 | * | 11/2006 | Gilbert et al. | 340/5.61 |
| 2008/0068128 A1 | * | 3/2008 | Ghabra et al. | 340/5.61 |

FOREIGN PATENT DOCUMENTS

JP 2000213218 * 9/2000

* cited by examiner

*Primary Examiner* — Daniel Previl
(74) *Attorney, Agent, or Firm* — KC Bean

(57) ABSTRACT

A security system is disclosed having a base controller, a base transceiver, a remote control, and a passive locking prevention device. The passive locking prevention device includes a detection device preferably located within the passenger compartment of the vehicle for detecting the remote control. The detection device preferably has a detection range extending only to the inside of the vehicle. The passive locking prevention device is configured such that the vehicle will not passively lock when the passive locking prevention device detects the remote control. The passive locking prevention device can be connected to the base controller via a wired or wireless connection. The remote control can contain an emission device that emits a detectable signal by the detection device, and upon such detection, the vehicle is prevented from locking. The system can visibly or audibly alert a vehicle owner if the vehicle is not passively locked.

28 Claims, 4 Drawing Sheets

SECURITY SYSTEM WITH PASSIVE LOCKING BYPASS

FIELD OF THE INVENTION

The present invention relates generally to security systems, and, more particularly, to security systems installed in automobiles and other mobile environments.

BACKGROUND

Security and alarm systems are known. A security system may be used to secure a perimeter or an object against theft, tampering, vandalism, invasion, unauthorized use or access, and other kinds of trespass. The secured object or perimeter may be, for example, a vehicle or a building, protected by sensors capable of detecting glass-break events; proximity or movement of a person; openings of doors, trunk, or hood; and other potential breaches of security. A typical security system designed for automotive applications is capable of responding to breaches of security, for example, by activating an alarm and rendering engine starter and engine computer systems inoperative. In addition, some security systems can control various safety and convenience features, such as power door locks, power windows, and entertainment system installed in the vehicle.

Many automotive security systems include a small handheld remote control device, such as a key-fob, that allows the system's user to perform various operations remotely. For example, the remote control device may lock and disarm the security system, lock and unlock doors and trunk, sound siren, start engine, and perform other functions when corresponding commands are entered by the user. If the security system is configured so that the remote control device can be used to lock and unlock doors of an automobile, the system effectively becomes a keyless entry device, in addition to performing other functions.

It is known in the art to automate the keyless entry function of a remote control device. For example, a hand-held remote control device may be configured to transmit periodically a command that opens doors and possibly also disarms the security system. It may also be the base station that periodically transmits a "feeler" or interrogatory transmission to the hand-held remote control device. When the remote control device receives the interrogatory transmission, it sends a responsive transmission to the base station. The base station and the hand-held device then perform a handshake protocol to verify each other's identity. After the handshake, the hand-held unit may transmit a command directing the base station to perform some function automatically, for example, to unlock one or more doors of an automobile. The doors then automatically unlock when the user carrying the hand-held device approaches the automobile. The feature of automatically unlocking doors when a user approaches the automobile is known as "passive" remote keyless entry. The system is passive in the sense that it opens doors and disarms itself without any deliberate user action, other than approaching the automobile.

A related feature of modern automobile security systems is the ability to automatically lock the doors after a user has exited the vehicle. This feature is known as "passive" locking. Passive locking allows a vehicle to be protected from unauthorized entry into the vehicle even if the user forgets to lock the security system. In some security systems, passive locking can occur after a predetermined time period after the user has exited the vehicle, such as 30 seconds. While passive locking provides great benefit to automotive security systems, a security system containing passive locking presents the possibility that if a vehicle owner's remote control is left inside a vehicle and the user exits the vehicle, the security system can passively lock the vehicle and lock the remote control inside the vehicle. This scenario can cause great inconvenience and cost, not to mention frustration, to the user. Therefore, it would be advantageous to provide a security system that can avoid this inconvenient scenario while still providing the benefits of passive locking.

SUMMARY

The preferred embodiment of the invention provides a security system having a base controller installed in a vehicle, a base transceiver installed in the vehicle and in communication with the base controller, a remote control, and a passive locking prevention device installed in the vehicle and in communication with the base controller. The remote control includes a human input device, such as a keypad, a display device such as a screen, and a remote control transceiver for communicating with a base transceiver. The passive locking prevention device includes a detection device preferably located within the passenger compartment of the vehicle for detecting the remote control. The detection device preferably has a detection range extending only to the inside of the vehicle. The detection device can be an electromagnetic field disturbance device. The passive locking prevention device is configured such that the vehicle will not passively lock when the locking prevention device detects the presence of the remote control. The passive locking prevention device can be connected to the base controller via a wired or wireless connection. The security system can alert a user if the vehicle is not passively locked because the remote control is within the vehicle.

Another embodiment of the invention provides a security system having a base controller installed in a vehicle, a base transceiver installed in the vehicle and in communication with the base controller, a remote control, and a passive locking prevention device installed in the vehicle and in communication with the base controller. The remote control includes a human input device, such as a keypad, a display device such as a screen, and a remote control transceiver for communicating with a base transceiver. The remote control further includes an emission device, such as an RFID tag. The passive locking prevention device comprises a detection device preferably located within the passenger compartment of the vehicle for detecting an emission from the remote control. The detection device preferably has a detection range extending only to the inside of the vehicle. The passive locking prevention device is configured such that the vehicle will not passively lock when the passive locking prevention device detects an emission from the emission device. The passive locking prevention device can be connected to the base controller via a wired or wireless connection. The security system can alert a user if the vehicle is not passively locked because the remote control is within the vehicle.

In another embodiment, the security system can include means for detecting when a vehicle door has been manually locked with the remote control within the vehicle. Because the security system will not passively lock the system if the doors are manually locked, the security system can include means for alerting a user that the vehicle has not been passively locked.

These and other features and aspects of the embodiments of the invention will be better understood with reference to the following description, drawings, and appended claims.

DETAILED DESCRIPTION OF THE EMBODIMENTS

Figure 1:
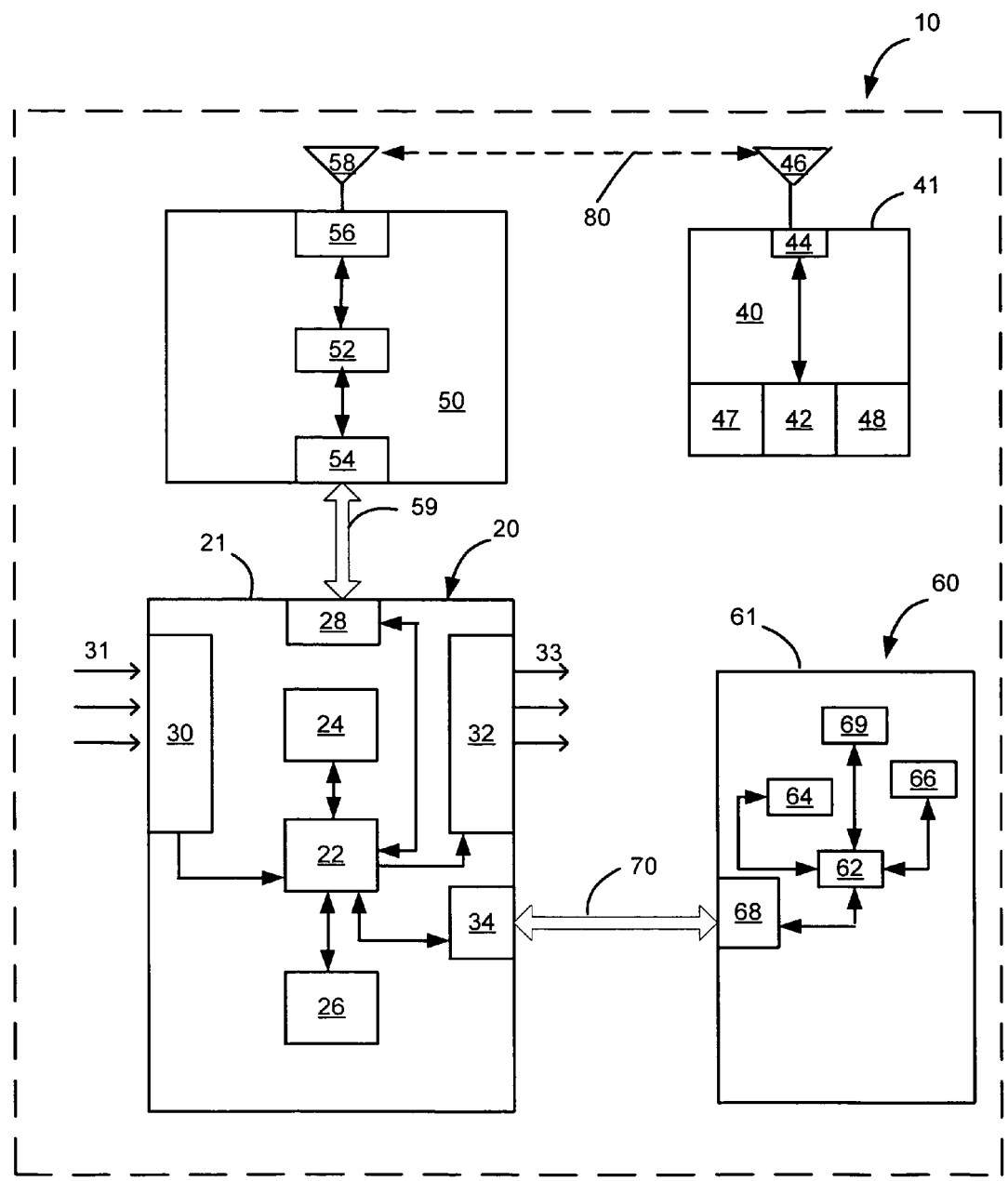
FIG. 1 shows a block diagram of the preferred embodiment of the security system with passive locking bypass capabilities.

Reference will now be made in detail to several embodiments of the invention that are illustrated in the accompanying drawings. Wherever possible, same or similar reference numerals are used in the drawings and the description to refer to the same or like parts. The drawings are in a simplified form and are not to precise scale. For purposes of convenience and clarity only, directional terms, such as, top, bottom, left, right, up, down, over, above, below, beneath, rear, and front, may be used with respect to the accompanying drawings. These and similar directional terms should not be construed to limit the scope of the invention in any manner. Furthermore, in descriptions and in claims, "couple," "connect," and similar words with their inflectional morphemes do not necessarily import an immediate or direct connection, but include connections through mediate elements within their meanings.

Referring more particularly to the drawings, FIG. 1 illustrates a block diagram of the preferred embodiment of a security system with passive locking bypass capabilities 10. Security system 10 includes a base controller 20, a remote control 40, a transceiver 50, and a passive locking prevention device 60. Base controller 20, transceiver 50, and passive locking prevention device 60 are all preferably located within the passenger compartment of the vehicle, while remote control 40 is a portable unit that can be transported in or out of the vehicle (see FIG. 3). Although in this figure, transceiver 50 is shown separate from base controller 20, it is to be noted that in other embodiments transceiver 50 can be implemented within base controller 20. Such an embodiment can have the effect of reducing costs and decreasing the possibility of communication failures within system 10. Although the benefit of system 10 is primarily achieved in connection with security systems with passive locking capabilities, system 10 can be implemented in connection with other types of security systems, including but not limited to remote start systems, anti-theft systems, and keyless entry systems. In addition, system 10 can be incorporated into systems that also have passive arming capabilities, wherein the security system passively "arms" a certain period after a person exits a vehicle. The passive locking bypass feature of system 10 will not prevent passive arming in such passive arming systems. However, it is within the scope of the embodiments of the present invention that system 10 can have the ability to prevent passive arming of a security system in addition to preventing passive locking of the security system.

Base controller 20 performs the logic and interface functions of the security system 10. Base controller 20 includes a housing 21, a base processor 22 coupled to a random access memory (RAM) 24 and to a read only memory (ROM) 26. RAM 24 is a non-permanent memory for storing intermediate results and other temporary data generated by base processor 22 in the course of executing the program code. ROM 26 stores the program code executed by base processor 22 and the preprogrammed data used by base processor 22 in the course of executing the program code. The ROM 26 may include a programmable ROM (PROM) module, an electrically programmable ROM (EPROM) module, and an electrically erasable programmable ROM (EEPROM) module.

Base controller 20 further includes a transceiver interface block 28, through which base controller 20 communicates with transceiver 50, remote control 40, and input/output (I/O) blocks 30 and 32. Transceiver interface block 28 is preferably connected to processor 22, such that processor 22 can send and receive input from transceiver interface block 28. The I/O block 30 couples base processor 20 to inputs 31, which are connected to various sensors and user controls of the security system 10, such as a program switch, vibration sensor, movement sensor, door and trunk status (open/close) sensors, ignition sensor, and other sensors and controls. The I/O block 32 provides base processor 22 with the capability to control various output devices connected to outputs 33, such as system status LEDs that indicate whether the system 10 is on or off, and whether an alarm event has occurred since activation of the system. Additionally, base processor 22 uses I/O block 32 to activate the siren of the security system 10. In some variants of security system 10, I/O blocks 30 and 32 also provide connections to a battery voltage monitor, trunk release solenoid, wireless telephone link, vehicle locator system, relays operating power windows, power lock solenoids, and ignition and starter activation relays used to start the car remotely. I/O blocks 30 and 32 enable base controller 20 to receive the inputs that are needed for or effect the operation of security system 10, and to operate various indicators and other output devices that are part of security system 10 or that can be used in conjunction with security system 10.

A bus interface block 34 couples base controller 20 to passive locking prevention device 60 via a bus 70. In the particular embodiment of FIG. 1, bus 70 includes a serial data bus. Thus, bus interface block 34 includes a serial interface port. More generally, variants of system 10 in accordance with the present invention can use various other connections between the passive locking prevention device 60 and system 10, including parallel digital buses, analog connections, optical links, radio frequency (RF) links, infrared links, and other wired and wireless connections. In each case, bus interface block 34 takes appropriate form in accordance with the actual connection used. For example, where bus 70 is a parallel bus, bus interface block 34 is a parallel port.

In system 10, base controller 20 is implemented as a microcontroller, with processor 22, memories 24 and 26, and I/O blocks 30 and 32 being fabricated on the same integrated circuit. In other embodiments, base controller 20 is implemented as a microprocessor with the memories and some of the I/O blocks being physically located on integrated circuits other than the integrated circuit containing the microprocessor. While microprocessors and microcontrollers represent general-purpose, software-driven digital state machines that can be used for performing many functions of base controller 20, and of other processors and controllers described in this document, in some embodiments, these processors are implemented as application-specific digital state machines. These digital state machines can be primarily or exclusively hardware-based engines, and can also combine both hardware and software functions.

Remote control 40 includes housing 41 that contains a controller 42, a transceiver 44, and an antenna 46 that allows controller 42 to communicate with antenna 58 on transceiver 50 over a communication link 80. Link 80 may comprise various types of communication links, such as infrared, Bluetooth and RF. Remote control 40 further includes an alphanumeric display 47, and input devices 48. Input devices 48 can include, but are not limited to, scroll wheel devices, push buttons, touch pad devices, biometric input devices, and any other device capable of receiving input from a user as recognized in the art. Remote control 40 can contain one or multiple input devices 48. Using input devices 48, the operator of security system 10 can send remote commands to security system 10. Using display 47, the operator of security system 10 can visibly receive commands from security system 10.

Transceiver 50 includes a processor 52, a controller interface block 54, a signal processing element 56, and an antenna 58. Controller interface block 54 allows transceiver 50 to communicate with transceiver interface block 28 over a communication link 59, which can be a serial link. Link 59 may also comprise various types of wireless communication links, such as infrared, Bluetooth and RF. Controller interface block 54 is connected to processor 52 to allow communication between the two elements. Signal processing element 56 is also connected to processor 52. Signal processing element sends signals from processor 52 to antenna 58 and sends signals from antenna 58 to processor 52. When processor 52 has received a signal, processor 52 can cause the signal to be transmitted to interface block 54 for sending to base controller 20. Transceiver 50 can be located in a separate housing within a vehicle. However, in other embodiments, transceiver 50 can be integrated within processor 52, or similar microcontroller, eliminating the need for controller interface block 54, transceiver interface block 28, and communication link 59.

Passive locking prevention device 60 includes a processor 62, memory modules 64 and 66, an interface port 68, and remote control detection means 69 for detecting the presence of remote control 40. Interface port 68 is similar to port 34 of base controller 20 in that it provides data flow between base processor 20 and passive locking prevention device 60. Memory module 64 can include both RAM and ROM modules, while memory module 66 can comprise a non-volatile, electrically programmable memory module. In the embodiment illustrated in FIG. 1, memory module 66 is an EEPROM. However, it should be recognized that memory modules 64 and 66, although shown as two separate modules, can be combined into one memory module that contains the ability to provide both functions. Further, some embodiments of the invention may only utilize one memory module and still remain within the scope of the invention.

Processor 62 executes program code stored in memory module 66, selectively activating and deactivating normal operation of passive locking prevention device 60. Remote control detection means 69 is preferably connected to processor 62 either via a wired or wireless connection. Remote control detection means 69 is preferably an electromagnetic field disturbance device. Detection means 69 can comprise a magnetic core having at least two windings disposed thereon. The magnetic core may comprise any suitable magnetic material, such as AlNiCo materials or ferrites. Detection means 69 can also be a magnetic field sensor, an electronic sensor, a magnetic field detection circuit, Bluetooth, RFID, or other detection means as would be recognizable by one with ordinary skill in the art. The size of detection means 69 can vary depending on the strength of magnetic material used, with stronger magnetic materials requiring less material to be used within detection means 69. Passive locking prevention device 60 can include a housing 61 that separately contains processor 62, memory modules 64 and 66, interface port 68, and remote control detection means 69, or, passive locking prevention device 60 can be integrated into another housing such as base controller 20, within the passenger compartment.

Figure 2:
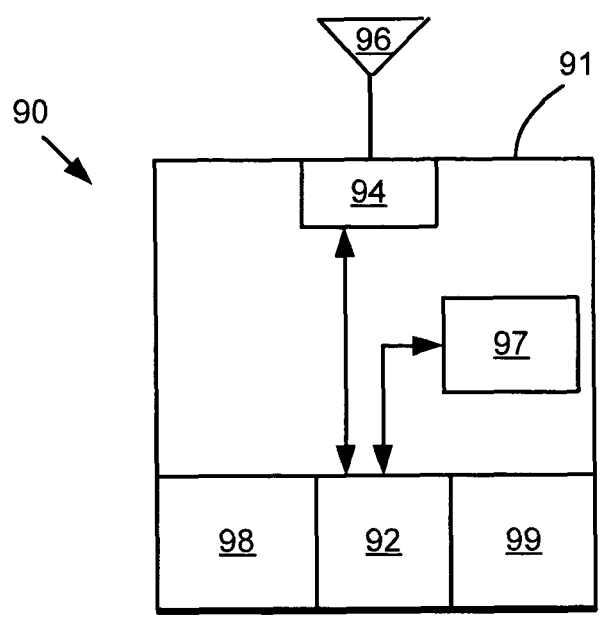
FIG. 2 shows a block diagram of an embodiment of the remote control for use with the security system with passive locking bypass capabilities.

FIG. 2 shows a block diagram of another embodiment of a remote control 90 for use with the security system 10 with passive locking bypass capabilities. Remote 90 includes housing 91 that contains a controller 92, a transceiver 94, an antenna 96, and an emission device 97. Antenna 96 allows controller 92 to communicate with antenna 58 on transceiver 50 over RF communication link 80 (see FIG. 1). Remote control 90 further includes a display 98, such as a LED screen, LCD screen, alphanumeric display, or other display device, and input devices 99. Input devices 99 can include, but are not limited to, scroll wheel devices, push buttons, touch pad devices, biometric input devices, and any other device capable of receiving input from a user as recognized in the art. Remote control 90 can contain one or multiple input devices 99. Using input devices 99, the operator of security system 10 can send and receive remote commands to and from security system 10. Emission device 97 generates a signal (not shown) for detection by detection means 69 (see FIG. 1). Emission device 97 can comprise a radio frequency identification device, a sound producing device, a laser device, a wireless signal device, or other device that emits a detectable signal as would be recognized by one with ordinary skill in the art. The signal can be a radio frequency signal, microwave signal, infrared signal, sound signal, light signal, or any other signal that can be detected as recognized in the art. Emission device 97 is connected to processor 92 via a wired or wireless connection to allow processor 22 to receive signals from emission device 97 and transmit signals to emission device 97.

Figure 3:
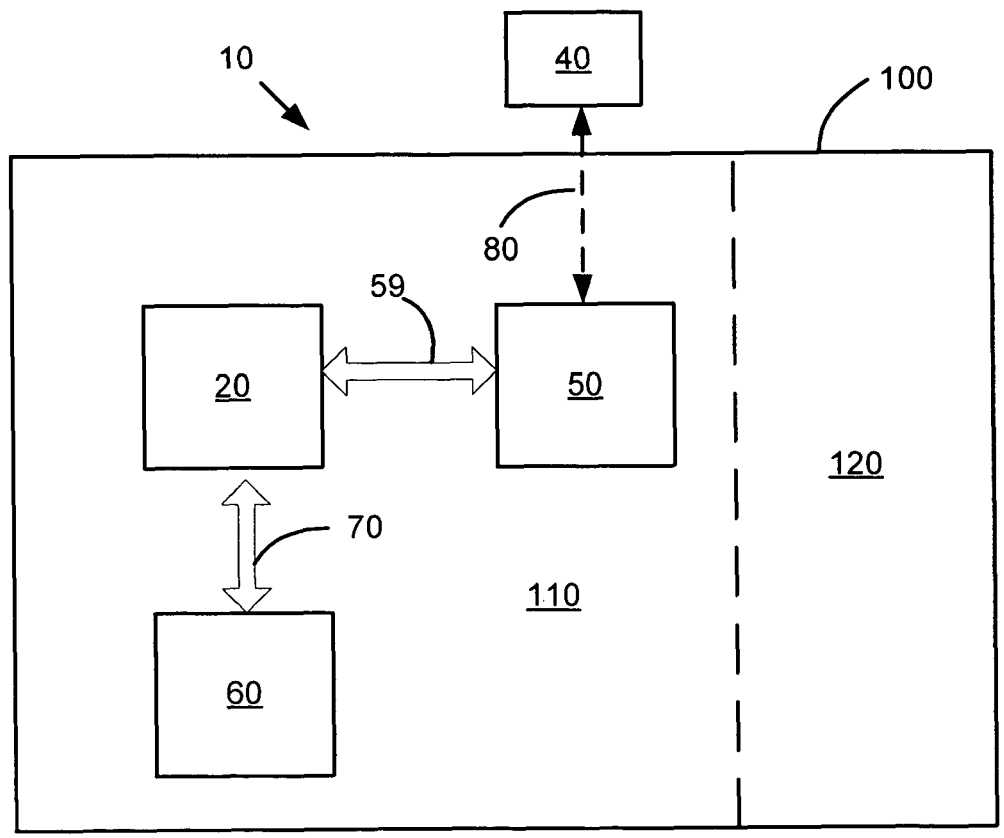
FIG. 3 shows a block diagram of another embodiment of the security system with passive locking bypass capabilities.

FIG. 3 illustrates a block diagram of one possible configuration of the security system with passive locking bypass capabilities 10 within a vehicle 100. Although in this figure the vehicle depicted is an automobile, vehicle 100 is in no way restricted to an automobile, and can include a motorcycle, recreational vehicle, or other vehicle capable of having a security system connected thereto. Vehicle 100 preferably includes a passenger compartment 110 and an engine compartment 120. In this configuration, base controller 20, transceiver 50, and a passive locking prevention device 60 are located within, but are not limited to, passenger compartment 110. Remote control 40 is shown outside of vehicle 100. However, because remote control 40 is a portable device, it can also be located within vehicle 100, depending on the location of a user.

Figure 4:
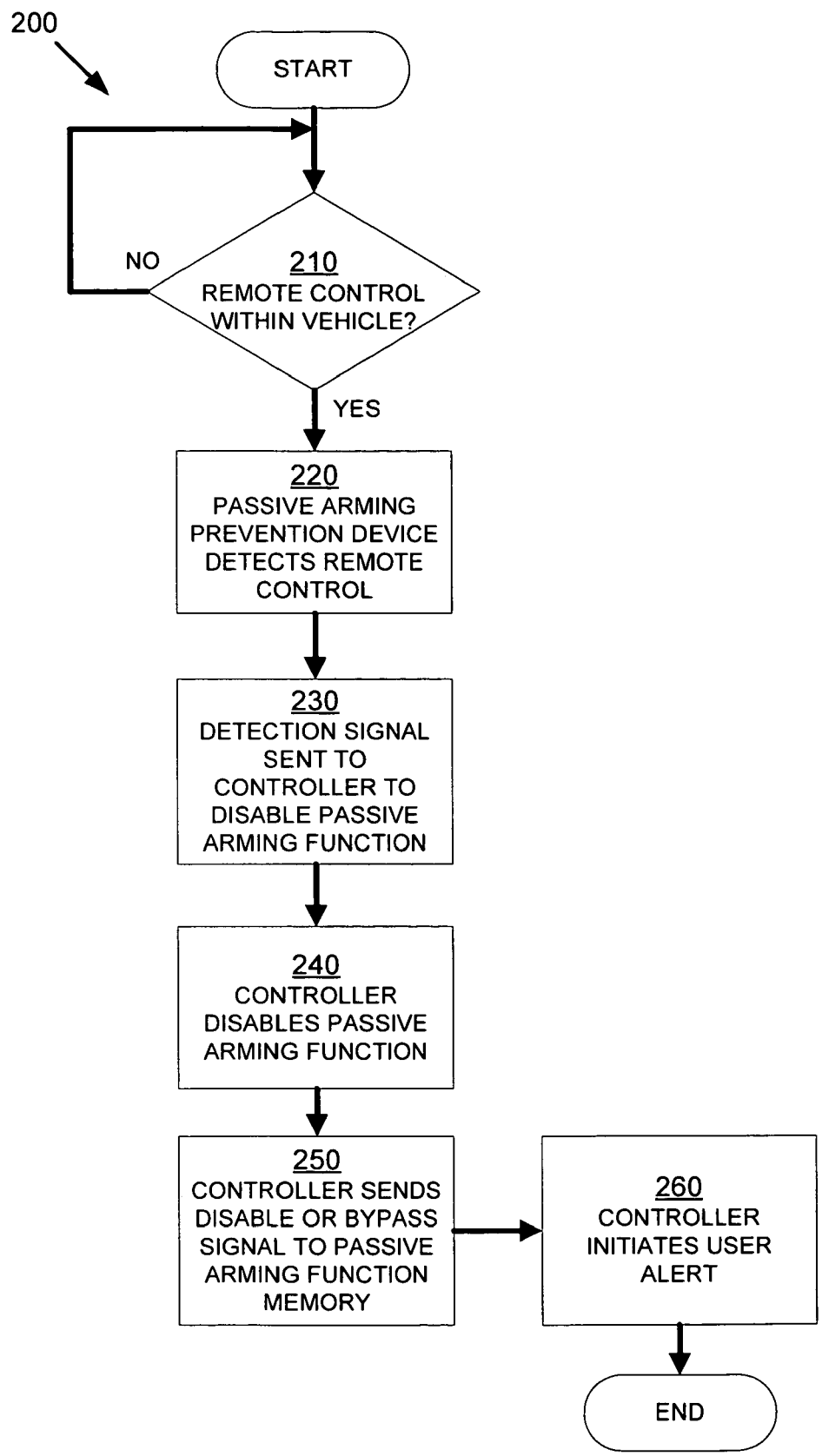
FIG. 4 shows a flow diagram of one embodiment of preventing passive locking of a security system via the security system with passive locking bypass capabilities.

FIG. 4 shows a flow diagram of selected steps of a method 200 for preventing the passive locking of a security system. For description purposes, method 200 will be described with reference to security system 10 as disclosed herein. In this embodiment, method 200 begins at step 210 by passive locking prevention device 60 determining whether remote control 40 is within its detectable range. The detectible range is preferably limited to within the inner dimensions of the vehicle, so as not to interfere with other functions of security system 10, such as passive unlocking of the doors. The detectible range of a passive locking prevention device 60 with radio frequency detection capabilities can include all frequencies of the RF spectrum allowed for this purpose. If remote control 40 is not within range, method 200 repeats step 210. If so, step 220 involves the detection of remote 40 by passive locking prevention device 60. Step 230 next involves passive locking prevention device 60 sending a signal to base controller 20 that remote control 40 has been detected and to request base controller 20 to disable the passive locking function of security system 10. The signal can be sent via bus 70 to bus interface block 34, wherein it is then sent to processor 22.

Step 240 then involves base controller 20 disabling the passive locking function. Controller 20 can disable the passive locking function by processor 22 performing an internal operation that can be retrieved from memory stored in ROM 26. Next, step 250 involves base controller 20 sending a disable or bypass signal to the address in RAM memory 24 that stores the passive locking function status. Finally, step 260 involves base controller 20 initiating an alert the make a vehicle owner aware that the vehicle has not been passively locked. The alert can occur in various ways, including but not limited to a flashing at least one of the vehicle lights, a chirping of the alarm siren, a honking of the vehicle horn, or initiating another visual or audible output to gain the attention of a vehicle owner. The alert can be caused by base controller 20 sending an electrical signal to the respective output device.

Figure 5:
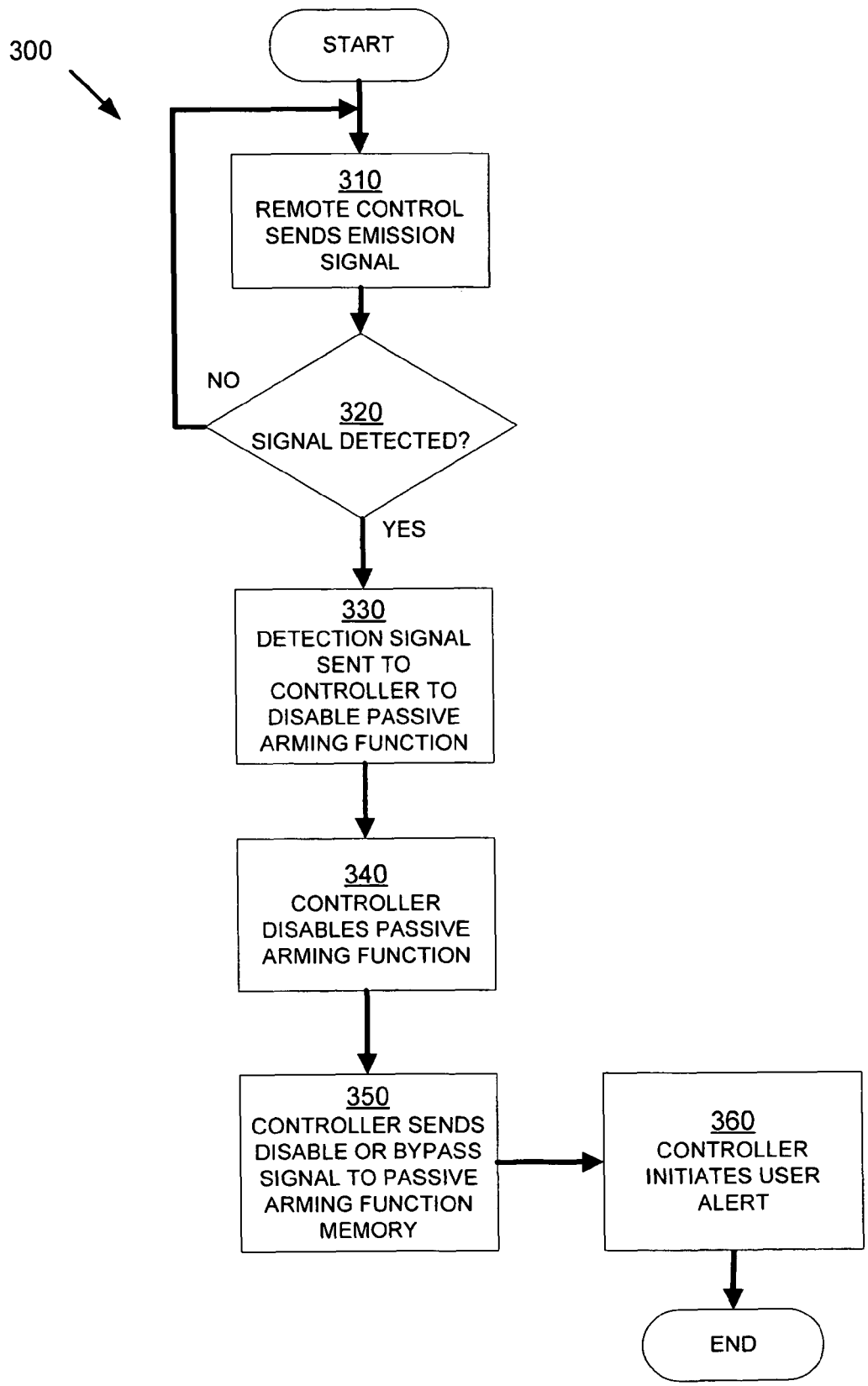
FIG. 5 shows a flow diagram of another embodiment of preventing passive locking of a security system via the security system with passive locking bypass capabilities.

FIG. 5 shows a flow diagram of selected steps of a method 300 for preventing the passive locking of a security system. For description purposes, method 300 will be described with reference to security system 10 as disclosed herein. In this embodiment, method 300 begins at step 310 by remote control 90 sending out an emission signal (not shown). Remote control 90 is preferably configured to send out a low range emission signal. A low range emission signal is used to allow passive locking prevention device 60 to only detect the emission signal when remote control 90 is located within a vehicle. Otherwise, if passive locking prevention device 60 detects an emission signal when remote control is outside of a vehicle, the other features of security system 10, such as passive unlocking, may not function properly. Step 320 involves passive locking prevention device 60 determining whether the emission signal of remote control 90 has been detected. If not, method 300 repeating step 310. If so, step 330 involves passive locking prevention device 60 sending a signal to base controller 20 that an emission signal has been detected and to request base controller 20 to disable the passive locking function of security system 10.

Step 340 then involves base controller 20 disabling the passive locking function. Base controller 20 can disable the passive locking function by processor 22 performing an internal operation, similar to that performed in step 240 described above. Next, step 350 involves base controller 20 sending a disable or bypass signal to the address in RAM memory 24 that stores the passive locking function status. Finally, step 360 involves controller 20 initiating an alert the make a vehicle owner aware that the vehicle has not been passively locked. The alert can occur in various ways, including but not limited to a flashing of the vehicle lights, a chirping of the alarm siren, a honking of the vehicle horn, or initiating another visual or audible output to gain the attention of a vehicle owner. The alert can be caused by base controller 20 sending an electrical signal to the respective output device.

This document describes the inventive devices for preventing the automatic locking of a vehicle security system while a vehicle owner's remote transmitter or other vehicle entry device remains within the vehicle. This disclosure is done for illustration purposes only. Neither the specific embodiments of the invention as a whole, nor those of its features limit the general principles underlying the invention. In particular, the invention is not limited to automobile security applications, but can be used within various vehicles, including but not limited to cars, trucks, vans, boats, motor homes, and buses. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is served by the claims and their equivalents.

I claim:

1. A security system for a vehicle having a passenger compartment and a data bus system, the security system comprising:
    a base controller configured to perform passive locking of said vehicle by communication of a passive lock signal over said data bus system;
    a base transceiver operatively connected to said base controller;
    a remote control; and
    a passive locking prevention device operatively connected to said base controller, said passive locking prevention device including means for detecting said remote control, and in response to detection of said remote control, sending a passive lock prevention signal preventing the security system from performing passive locking of said vehicle.

2. The security system of claim 1, wherein said remote control comprises:
    a housing;
    a human input device coupled to said housing;
    a display device coupled to said housing; and
    a transceiver contained within said housing for sending and receiving signals.

3. The security system of claim 1, wherein said means for detecting said remote control is located within said passenger compartment of said vehicle.

4. The security system of claim 3, wherein said means for detecting said remote control is configured to detect the presence of said remote control only if said remote control is within said vehicle passenger compartment.

5. The security system of claim 1, wherein said remote control contains emission device that emits a signal detectable by said means for detecting, wherein upon detection of said signal by said means for detecting, said security system is prevented from performing passive locking of said vehicle.

6. The security system of claim 5, where said emission device is a radio frequency identification device.

7. The security system of claim 5, wherein said signal is an infrared signal.

8. The security system of claim 5, wherein said signal is an audible signal.

9. The security system of claim 1, wherein said means for detecting has a detection range limited to the inside of said vehicle, and said passive locking prevention device is configured such that said vehicle will not passively lock when said passive locking prevention device detects said remote control inside said vehicle.

10. The security system of claim 1, wherein said passive locking prevention device is wirelessly connected to said base controller.

11. The security system of claim 1, wherein said means for detecting the said remote control comprises an external electromagnetic field disturbance device.

12. The security system of claim 1, wherein said passive locking prevention device further comprises:
    a housing;

a processor contained within the housing;
at least one memory module connected to the processor; and
at least one interface port connected to the processor.

13. The security system of claim 1, wherein said passive locking prevention device is operatively connected to said base controller via said data bus.

14. A security system for a vehicle having a passenger compartment comprising:
   a base controller configured to perform passive locking of said vehicle;
   a base transceiver operatively connected to said base controller;
   a remote control operatively connected to said base controller, said remote control including an emission device that emits a signal indicating the presence of said remote control within said passenger compartment; and
   a passive locking prevention device operatively connected to said base controller, said passive locking prevention device located within said passenger compartment and including a means for detecting said emitted signal wherein upon detection of said emitted signal, said passive locking prevention device prevents said security system from performing passive locking of said vehicle.

15. The security system of claim 14, wherein said means for detecting said emitted signal has a range limited to the inside of said vehicle and is configured to detect the presence of said remote control inside said vehicle.

16. The security system of claim 14, wherein said emission device is a radio frequency identification device.

17. The security system of claim 14, wherein said signal is an infrared signal.

18. The security system of claim 14, wherein said passive locking prevention device is wirelessly connected to said base controller.

19. The security system of claim 14, wherein said means for detecting said signal comprises an external electromagnetic field disturbance device.

20. The security system of claim 14, wherein said passive locking prevention device further includes:
   a housing;
   a processor contained within said housing, said detection device connected to said processor;
   at least one memory module connected to said processor; and
   said at least one interface port connected to said processor.

21. The security system of claim 14, wherein said passive locking prevention device is operatively connected to said base controller via a data bus.

22. A method for preventing the operation of the passive locking function of a security system of a vehicle having a passenger compartment and a data bus system, said security system including a base controller, a base transceiver operatively connected to said base controller, a remote control operatively connected to said base controller, and a passive locking prevention device operatively connected to said base controller, said passive locking prevention device including means for detecting said remote control, the method comprising the steps of:
   a) detecting the presence of said remote control within said passenger compartment;
   b) in response to detection of said remote control, sending a signal to said base controller to disable the passive locking function of said security system; and
   c) in response to signal to said base controller, disabling the passive locking function.

23. The method of claim 22 further comprising the step of sending a disable signal to memory designated for the passive locking function.

24. The method of claim 22 further comprising the step of alerting a vehicle owner that said vehicle has not been passively locked.

25. The method for of claim 24, wherein the step of alerting a vehicle owner that said vehicle has not been passively locked includes the step of initiating a visual output of said vehicle.

26. The method of claim 24, wherein the step of alerting a vehicle owner that said vehicle has not been passively locked includes the step of initiating an audible output of said vehicle.

27. The method of claim 24 further comprising the step of sending a disarm signal to memory designated for the passive locking function.

28. A method for preventing operation of passive locking function and a passive arming function of a security system of a vehicle, said security system including a base controller, a base transceiver operatively connected to said base controller, a remote control operatively connected to said base controller, and a passive locking prevention device operatively connected to said base controller, said passive locking prevention device including means for detecting said remote control, the method comprising the steps of:
   a) sending an emission signal to said base controller;
   b) detecting said emission signal;
   c) in response to detection of said emission signal, sending a signal to said base controller to disable the passive locking function of the security system; and
   d) in response to said signal to the base controller, disabling the passive locking function and the passive arming function.

* * * * *